D. BRECKENRIDGE.
THREAD CUTTING TOOL AND HOLDER THEREFOR.
APPLICATION FILED JAN. 24, 1921.
1,428,075.
Patented Sept. 5, 1922.
2 SHEETS—SHEET 1.
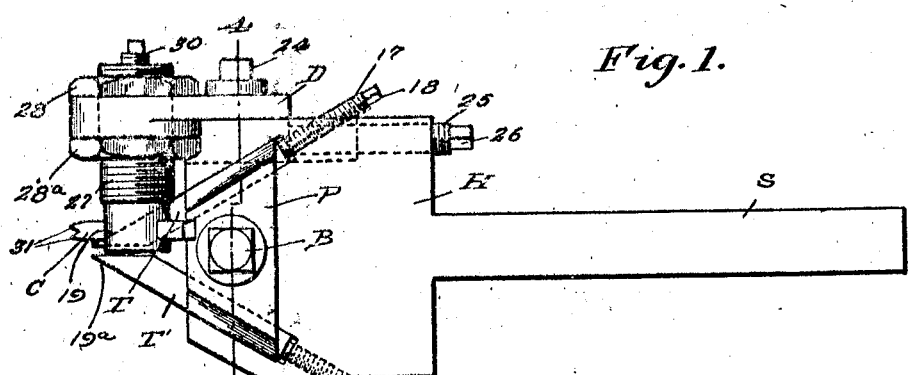
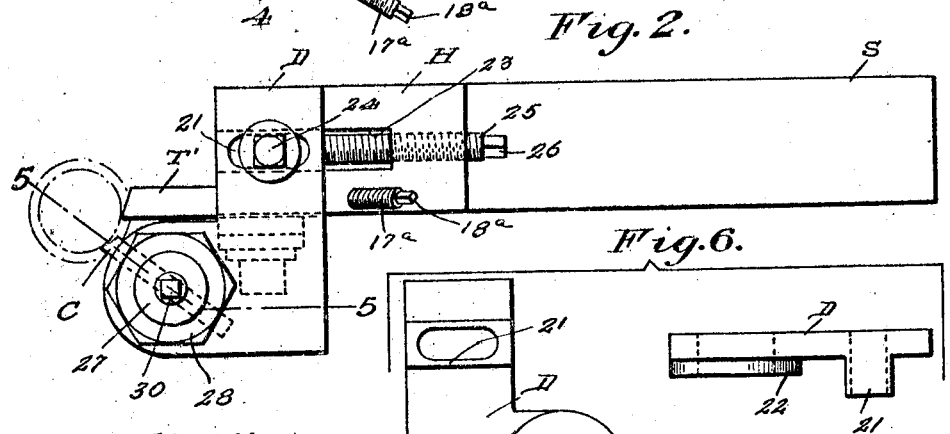
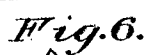
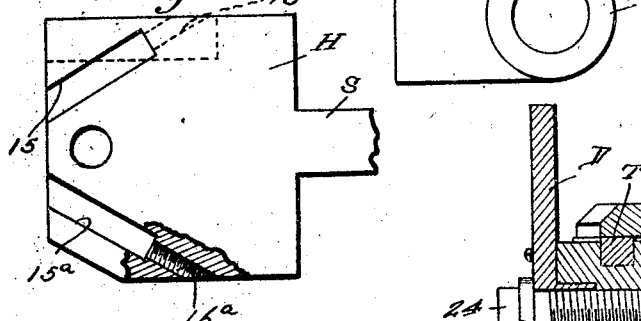
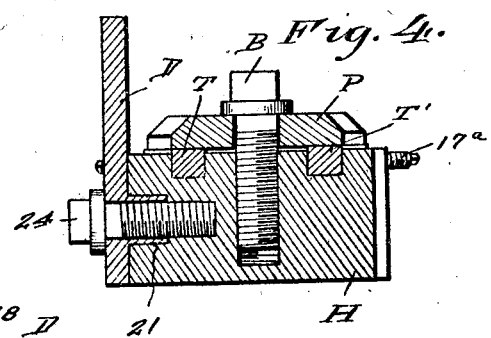
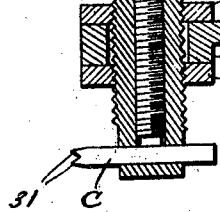
WITNESSES
R. A. Thomas
INVENTOR
David Breckenridge
BY
ATTORNEYS

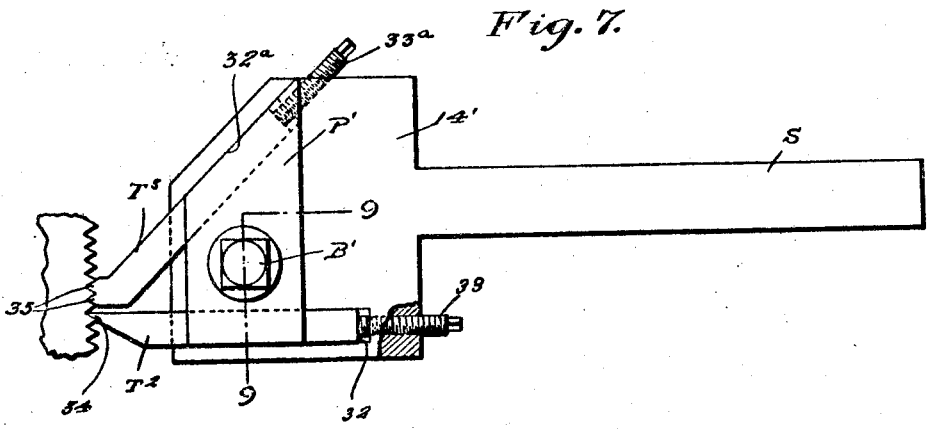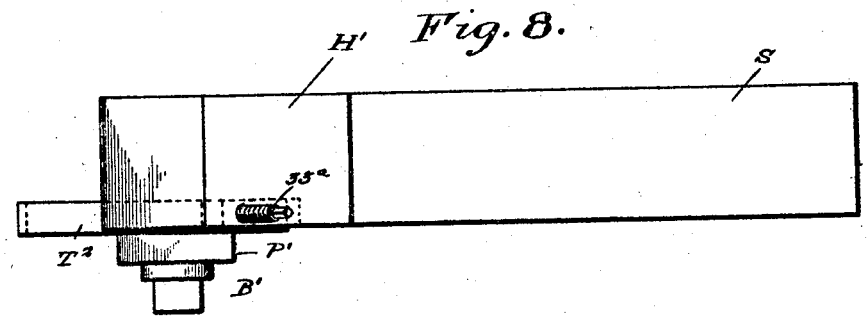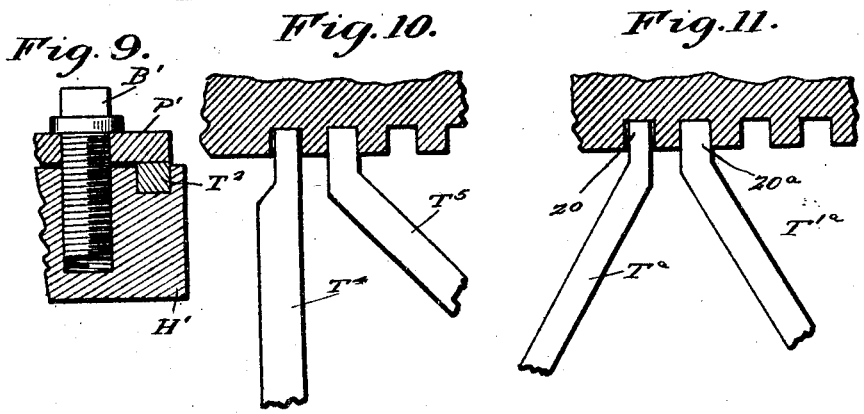

Patented Sept. 5, 1922.

1,428,075

UNITED STATES PATENT OFFICE.

DAVID BRECKENRIDGE, OF VICTORIA, BRITISH COLUMBIA, CANADA.

THREAD-CUTTING TOOL AND HOLDER THEREFOR.

Application filed January 24, 1921. Serial No. 439,577.

*To all whom it may concern:*

Be it known that I, DAVID BRECKENRIDGE, a subject of the King of Great Britain, and a resident of Victoria, in the Province of British Columbia and Dominion of Canada, have invented certain new and useful Improvements in Thread-Cutting Tools and Holders Therefor, of which the following is a specification.

My invention relates to thread cutting tools and holders therefor, the purpose of my invention being the provision of a novel form of cutting tool and holder therefor by means of which the cutting of screw threads of V or square form is effected with accuracy and dispatch, the tools so functioning as to lessen and cheapen the power and cost of operating. Furthermore, my invention provides a holder which adjustably supports the cutting tools so that threads of various pitch can be formed with the one and same set of tools and without the necessity of removing the tools from the holder.

I will describe three forms of cutting tools and two forms of holder each embodying my invention, and will then point out the novel features thereof in claims.

In the accompanying drawings:

Figure 1 is a view showing in top plan one form of holder and cutting tools embodying my invention.

Figure 2 is a top plan view of Figure 1.

Figure 3 is a plan view of the tool holder head with the tool removed.

Figure 4 is a sectional view taken on the line 4—4 of Figure 1.

Figure 5 is a horizontal sectional view taken on the line 5—5 of Figure 2.

Figure 6 is a detail view showing in plan and edge elevation, respectively, the angle plate of the chaser tool supporting bracket.

Figure 7 is a view showing in plan a modified form of tool holder and tools embodying my invention.

Figure 8 is a view showing in side elevation the tools and holder shown in Figure 7.

Figure 9 is a fragmentary sectional view taken on the line 9—9 of Figure 7.

Figures 10 and 11 are fragmentary detail views of modified forms of tools showing them in applied position with respect to a piece of work.

Similar reference characters refer to similar parts in each of the several views.

Referring specifically to the drawings and particularly to the holder shown in Figures 1 to 6 inclusive, S designates a shank by means of which the holder as a unit is supported in the usual manner upon a lathe, one end of the shank is formed with a head H. Divergent grooves 15 and $15^a$ are formed in the upper side of the head H which communicate with the forward side of the head and with bores 16 and $16^a$, respectively, also formed in the head H, as clearly shown in Figure 3. As shown in Figure 4, the grooves 15 and $15^a$ are of rectangular form in cross section and are adapted to slidably receive cutting tools T and T', the bores 16 and $16^a$ threadedly receiving screws 17 and $17^a$ which project into the grooves at one end and exteriorly of the head H at the other. The screws 17 and $17^a$ are designed to effect a forward feeding of the tools within the head, their projecting ends being provided with angularly shaped heads 18 and $18^a$ to which suitable tools are to be applied for effecting rotation of the screws. The tools T and T' are capable of being locked in adjusted position and against accidental displacement from the grooves by means of a clamping plate P of the form shown in Figure 1 and a bolt B threadedly fitted within the head H and arranged to securely hold the plate in bridging relation with respect to the grooves 15 and $15^a$. As shown in Figure 4, the height of the tools exceeds the depth of the grooves so that in the applied position of the plate it contacts with the tools and thus effectively secures them in adjusted position.

The forward or working ends of the tools T and T' are beveled, as shown in Figure 1, to provide cutting edges 19 and $19^a$. Although I have specifically described the cutting tool as being provided with cutting edges of that form, it is to be understood that tools having cutting edges of different forms may be equally well supported and held in working position by means of the tool holder. In Figure 11, I have shown two cutting tools designated at $T^a$ and $T'^a$ which are formed with rectangular working ends designated at 20 and $20^a$ which are designed for the purpose of cutting threads of rectangular form.

The tool holder shown in Figures 1 and 2 also embodies means for adjustably supporting a chasing tool that is adapted to follow the leading cutting tools T and T' along the threads formed by such tools for rounding the edges of the threads and removing the burs therefrom. The chasing tool is designated at C in Figures 1 and 2, and is adjustably supported upon the head H by means of an angle plate D formed at one end with an elongated collar 21 and at its opposite end with an annular collar 22, the two collars circumscribing openings of corresponding shape formed in the plate. The collar 21 is slidably fitted within a groove 23 formed in one side wall of the head H, and is adapted to receive a locking bolt 24 which extends into and threadedly engages the head H in the manner shown in Figure 4. A screw 25 is threadedly fitted within the head H and extends into the groove 23 and into abutting relation with respect to the collar 21 so that when the bolt 24 is adjusted to release the plate D, an adjustment of the plate on the head H can be effected by rotation of the screw 25 through a head 26 formed on the rear end of the latter. Extending through the collar 22 is a tool supporting sleeve 27 which is closed at its lower end and is provided in the side adjacent its end with openings adapted to receive the chasing tool C, as clearly shown in Figure 5. The sleeve 27 is screw threaded exteriorly for a major portion of its length to receive locking nuts 28 and 28$^a$ which, as shown in Figure 5, are arranged above and below the plate P so as to effect a locking of the sleeve in any vertically adjusted position. The sleeve 27 is also screw threaded interiorly to receive a locking screw 29, the lower end of which is adapted to engage the chasing tool C for securely retaining the tool within the sleeve. The upper end of the screw 29 is provided with a head 30 to which a tool is adapted to be applied for effecting a vertical adjustment of the screw to engage and release the chasing tool.

As shown in Figures 1 and 5, the chasing tool C in the present instance is provided with two cutting edges 31 that are tapered and spaced apart a distance corresponding to the width of the screw thread so that such thread will be received in the groove formed between the cutting edges.

In the application of the tools T and T' to a piece of work, the cutting edges 19 and 19$^a$ are first properly spaced apart, this being effected by a longitudinal adjustment of the tools through the medium of the screws 17 and 17$^a$ and the bolt B in a manner previously described. With the cutting edges properly adjusted, it will be clear that when the tools are moved into contact with a piece of work these cutting edges will form in the work grooves of corresponding shape, and between these grooves the V-shaped thread is formed. The chasing tool C is adjusted to follow the thread formed by the cutting tools, and as previously described this chasing tool removes all burs from the thread and rounds its edge. The supporting means for the chasing tool permits of any desired adjustment by moving the tool itself longitudinally within the sleeve 27 and adjusting the sleeve vertically with respect to the plate P, in the manner previously described. The tool in its entirety can be also adjusted longitudinally by adjusting the plate P upon the head H through the medium of the screw 29 and the bolt 24.

Referring now to Figures 7, 8 and 9, I have here shown a modified form of tool holder and chasing tool. In the present embodiment, the tool head designated at H' is likewise formed with tool receiving grooves. The grooves in the present instance are designated at 32 and 32$^a$, the groove 32 being in parallelism with the shank S while the groove 32$^a$ is disposed at an acute angle with relation to the groove 32. These grooves communicate at their rear ends with threaded bores in which adjusting screws 33 and 33$^a$ are adapted to work for effecting a longitudinal adjustment of the cutting tools. The cutting toolse are designated at T$^2$ and T$^3$, the cutting tool T$^2$ being of linear form and beveled at its forward end to provide a cutting edge 34. The tool T$^3$ has its working end offset and disposed in parallelism to the working end of the tool T$^2$. The tool T$^2$ is purely a cutting tool while the tool T$^3$ is formed with two cutting edges 35 which are similar in form to the cutting edges of the chasing tool C so as to likewise provide a chasing tool.

The tools T$^2$ and T$^3$ are secured in any adjusted position by means of a plate P' which is arranged in bridging relation with respect to the grooves 32 and 32$^a$ and is secured in clamping engagement with respect to the tools by means of a bolt B', in the manner clearly shown in Figure 9. In Figure 10, two tools T$^4$ and T$^5$ are shown which are similar to the tools T$^2$ and T$^3$ but are provided with working ends of rectangular form and are more particularly adapted for the cutting of square threads.

The operation of the tools and holder shown in Figures 7 and 8 is substantially the same as that described in connection with the structure shown in Figures 1 and 2, it being understood that the tool T$^2$ effects the cutting of the threads while the tool T$^3$ functions as a chaser for removing burs and rounding the edge of the thread.

From the foregoing description, taken in conjunction with the accompanying drawings, it will be clear that I have provided cutting and chasing tools of novel form which are adapted to be associated with each other and to a piece of work to cut and finish screw threads of various forms, the construction of the holders providing accurate adjustments for the tools and rigid supporting means whereby, the tools will be caused to form threads of various pitch with accuracy and dispatch. By virtue of the manner in which the two cutting tools coact to form the threads, it will be clear that each tool performs its quota of work so that less power is necessary in the driving of the work than in tools heretofore proposed.

Although I have herein shown and described only three forms of cutting tools and chasing tools and two forms of holders, it is to be understood that various changes and modifications may be made herein without departing from the spirit of the invention and the spirit and scope of the appended claims.

I claim:

1. In combination, a pair of cutting tools having tapered cutting edges, means for sustaining the cutting edges in adjusted position, a chasing tool, and means for adjustably supporting the chasing tool in working relation with respect to the pair of cutting tools.

2. In combination, a pair of cutting tools having tapered cutting edges, means for adjustably supporting the tools in divergent relation with respect to each other whereby the distance between the cutting edges of the tools can be varied and the relative position thereof maintained, a chasing tool formed with two cutting edges, and means for adjustably supporting the tool in following relation with respect to the cutting tools.

3. A tool holder comprising, a head, divergent grooves formed in the head, tools slidably fitted within the grooves, screws threadedly fitted within the head and engageable within the tools for moving the latter longitudinally within the grooves, and a clamping plate removably secured in spanning relation with respect to the grooves.

4. A tool holder comprising, a head, divergent grooves formed in the head, tools slidably fitted within the grooves, screws threadedly fitted within the head and engageable within the tools for moving the latter longitudinally within the grooves, a clamping plate removably secured in spanning relation with respect to the grooves, a plate secured to and adjustable longitudinally of the head, a sleeve adjustably mounted on the plate, and a tool removably carried by said sleeve.

5. A tool holder comprising, a head, divergent grooves formed in the head, tools slidably fitted within the grooves, screws threadedly fitted within the head and engageable within the tools for moving the latter longitudinally within the grooves, a clamping plate removably secured in spanning relation with respect to the grooves, a slot formed in said head, a plate, a bolt extending through the plate and into said slot, a screw mounted within the head and engageable with said plate, a sleeve adjustably supported on the plate, a tool supported by said sleeve, and a screw threadedly mounted on the sleeve and engageable with said tool for locking the same within the sleeve.

6. A tool holder comprising, a head, divergent grooves formed in the head, tools slidably fitted within the grooves, screws threadedly fitted within the head and engageable within the tools for moving the latter longitudinally within the grooves, a clamping plate removably secured in spanning relation with respect to the grooves, a slot formed in said head, a plate, an elongated flanged opening formed in the plate, a bolt extending through said opening and threadedly fitted within one of the walls of said slot, a screw threadedly mounted within the head and engageable with the plate, a sleeve extending through the plate, nuts threadedly engaging the sleeve at opposite sides of the plate for locking the sleeve in longitudinally adjusted position, a tool extending through the sleeve, and a screw threadedly mounted within the sleeve and engageable with said tool.

DAVID BRECKENRIDGE.